United States Patent [19]

Cross et al.

[11] Patent Number: 4,554,439
[45] Date of Patent: Nov. 19, 1985

[54] TWO WIRE HEATER REGULATOR CONTROL CIRCUIT HAVING CONTINUOUS TEMPERATURE SENSING EXCITATION INDEPENDENT OF THE APPLICATION OF HEATER VOLTAGE

[75] Inventors: Michael Cross, Turtle Creek; John T. Gordon, Ambridge, both of Pa.

[73] Assignee: Westinghouse Electric Corp., Pittsburgh, Pa.

[21] Appl. No.: 674,706

[22] Filed: Nov. 23, 1984

Related U.S. Application Data

[63] Continuation of Ser. No. 432,604, Oct. 4, 1982, abandoned.

[51] Int. Cl.[4] ............................................. H05B 1/02
[52] U.S. Cl. .................................. 219/497; 219/501; 219/499; 219/505; 323/235; 323/365
[58] Field of Search ............... 219/490, 494, 491, 497, 219/499, 518, 505, 501, 212, 507; 323/235, 365; 307/117

[56] References Cited

U.S. PATENT DOCUMENTS

| | | | |
|---|---|---|---|
| 3,946,198 | 3/1976 | Foote | 219/499 |
| 4,002,882 | 1/1977 | McCutchen | 219/499 |
| 4,272,671 | 6/1981 | Hukagawa et al. | 219/518 |
| 4,278,872 | 7/1981 | Koether et al. | 219/506 |
| 4,314,143 | 2/1982 | Bilstad et al. | 219/506 |
| 4,359,626 | 11/1982 | Potter | 219/212 |

Primary Examiner—M. H. Paschall
Attorney, Agent, or Firm—Thomas R. Trempus

[57] ABSTRACT

A heater control circuit functions in conjunction with a suitable heating coil to provide precision, automatic temperature regulation. The combination of heating and temperature sensing functions into a single system results in a two-wire heater regulator control circuit in which a continuous excitation voltage and a power voltage can be simultaneously present at the heater coil. Temperature of the heater is established by continuous excitation and sensing independent of the occurrence of power for heating. A short circuit protection circuit is responsive to an electrical short in the heater coil (which significantly changes its resistance with temperature) and disables the power voltage.

6 Claims, 4 Drawing Figures

TWO WIRE HEATER REGULATOR CONTROL CIRCUIT HAVING CONTINUOUS TEMPERATURE SENSING EXCITATION INDEPENDENT OF THE APPLICATION OF HEATER VOLTAGE

This application is a continuation of application Ser. No. 432,604, filed Oct. 4, 1982 now abandoned.

BACKGROUND OF THE INVENTION

1. Field of the Invention

The invention is directed to a control circuit which in conjunction with a heating coil provides precise, automatic temperature regulation. More particularly, both the power for heating the coil and the power for the determination of the temperature thereof as reflected by the resistance of the coil can be simultaneously provided through the same two wire leads of the coil. Specifically, the temperature of the heater is established by continuous excitation and sensing that is independent of the actuation of the source of heating power to the coil.

2. Description of the Prior Art

Several approaches to the control of temperature for a heater have employed a two wire heater regulator method. Typically the heating coil has a positive temperature coefficient of resistance and the voltage derived from passing a current through the heating coil is compared to a voltage developed across a reference resistor. The difference, if any, between these two voltages is determined and either an increase or a decrease in the level of power delivered to the heating coil is effected. The power level adjustment is reflected in a corresponding increase or decrease in the temperature of the heating coil.

A convenient method for obtaining the voltage difference measurement is to configure the heating coil as one leg of a four leg impedance bridge circuit. Any variance from the null balance condition at the center of the bridge indicates that a power adjustment is required. In a bridge circuit configuration, a first voltage source excites both the heating coil and the reference resistors for temperature sensing and resistance balancing functions and a second voltage source provides power only across the heating coil for temperature adjustment thereof. Bridge excitation for sensing and heater coil power for temperature adjustment are provided across the same two heater coil leads.

The fundamental drawback experienced in this arrangement is centered in the practical need to isolate the low level control voltage for sensing excitation from the AC line voltage for temperature adjustment, because both voltages are simultaneously required to implement their respective functions.

It has been suggested that the heating coil power source be modified to function as a low power excitation source. For example, a heating coil power source can be modified to provide either low level continuous or periodically pulsed or synchronously pulsed sensing voltage. However, either power stage heat dissipation, closed loop regulation, or noise generation must be compromised in order for the heating coil power source to provide the voltage necessary for both the heating and sensing functions.

Other proposed solutions to the dual power requirements of a two wire heating coil include alternating, either periodically and/or synchronously, the excitation source with the power source, or providing a source of continuous AC excitation with a DC power source for heater coil temperature adjustment. In the former proposed solution, the alternate switching of the excitation and power sources as well as their time separation is mandatory, while in the latter, bridge capacitors and a more complex power stage are required.

A further drawback inherent in the prior art of two wire heater control circuits is the impracticability of adequate fusing for overall circuit protection because the initial current is often much higher than the final current at setpoint. Another problem rests in the fact that a component failure in the circuitry controlling the alternation of the excitation source with the power source will most probably result in the cataclysmic failure of the entire heater control circuit.

It is therefore, an object of this invention to provide a two wire heater regulator control circuit which overcomes the aforementioned prior art limitations. The present invention utilizes a continuous sensing voltage and a heater coil power voltage which can be simultaneously applied to the heater coil.

It is also an object of this invention to provide means for the isolation of the sources of sensing voltage and heater coil voltage.

It is a further object of this invention to provide a short circuit protection circuit responsive to heater coil failure.

SUMMARY OF THE INVENTION

The invention is a system for controlling the temperature of a heater apparatus having a heater element therein, the electrical resistance of which is a function of the temperature of the apparatus. The system includes circuitry of providing a continuous sensing excitation voltage to a bridge circuit having the heater element as one leg thereof, a heater voltage source and circuitry isolating the sensing voltage from the heater voltage. A comparator is responsive to differences between a reference voltage and the voltage at the heater element and control circuitry is responsive to the comparator's output. The heater voltage is applied as required to raise the temperature of the heater. This invention can provide full cycle phase control firing or integral cycle control through the use of line voltage zero detecting circuitry and an appropriate logic circuit.

The entire circuitry of this invention is also protected from an electrical short in the heater element by identifying a voltage at the heater element in excess of a predetermined limit by means of a short circuit protection circuit.

BRIEF DESCRIPTION OF THE DRAWINGS

The above as well as other features and advantages of this invention will become apparent through consideration of the detailed description in connection with the accompanying drawings in which.

DETAILED DESCRIPTION OF THE INVENTION

Figure 1:
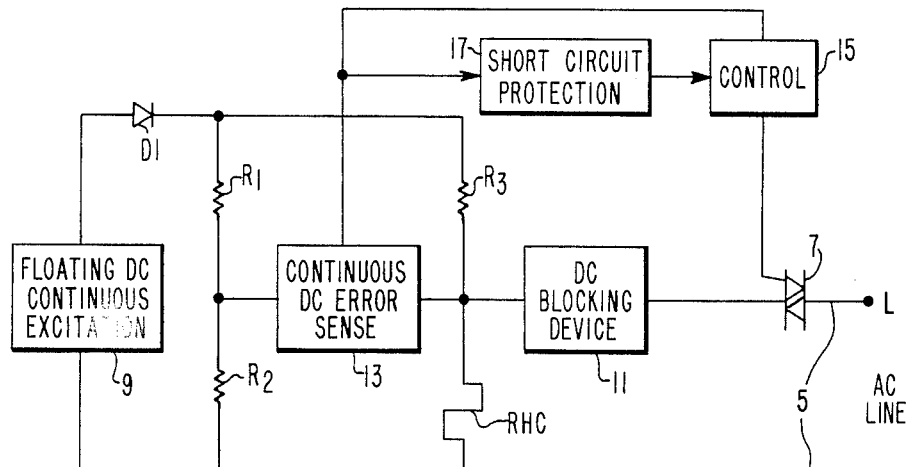
FIG. 1 is a block and circuit diagram of a two wire heater regulator control circuit according to this invention.

Considering FIG. 1, a four leg resistive bridge includes resistors R1, R2, R3 which make up three legs of the bridge and the resistive device RHC to be controlled by the regulator circuit of this invention, which makes up the fourth leg of the bridge. While the particular resistive device RHC illustrated herein is a heater coil having a positive temperature coefficient of resistance, it should be understood that the control circuit of this invention can be utilized in other applications in which power is applied to, or withheld from a load according to the resistance of the load. When the resistance of the heating coil RHC is accurately measured, changes therein reflect changes in the temperature of the heating coil itself.

The voltage necessary for heater coil temperature adjustment is provided directly from an AC power line as at 5 and is controlled by switch means 7. A low level DC excitation voltage as at 9 is continuously applied to the four legs of the resistive bridge. The DC excitation voltage is floating with respect to the AC line voltage. Isolation between the two sources is effected by a DC blocking means 11 that prevents the continuous DC excitation from flowing into the AC line when the switch means 7 is actuated. The DC blocking means 11 also protects the heater coil RHC from being shorted by the low source impedance of the AC line 5. Such a short would prevent the sense and compare function from occurring simultaneously with the application of AC power for coil heating. To a lesser extent, circuit isolation is also provided by an AC blocking device such as diode D1 and the high input impedance of the continuous DC error sense circuit 13. Because the bridge circuit is purely resistive, it allows a pure DC signal representing bridge imbalance to be accurately generated by the error sense circuit 13. A control circuit 15 is responsive to the DC error imbalance signal and effects the actuation of the AC switch means 7.

The invention also provides a short circuit protection circuit 17 responsive to an error imbalance signal from the DC error sense circuit 13. The protection circuit 17 continuously monitors the DC error signal for a predetermined voltage level which is indicative of a short at the heater coil. If this predetermined voltage level is sensed, the protection circuit 17 signals the immediate shutdown of AC power to the heater coil RHC and the switch means 7 is deactivated. Under normal operating conditions, the switch means 7 would be activated and deactivated according to the continuous DC error sense circuit 13 output and the control circuit 15.

Figure 2:
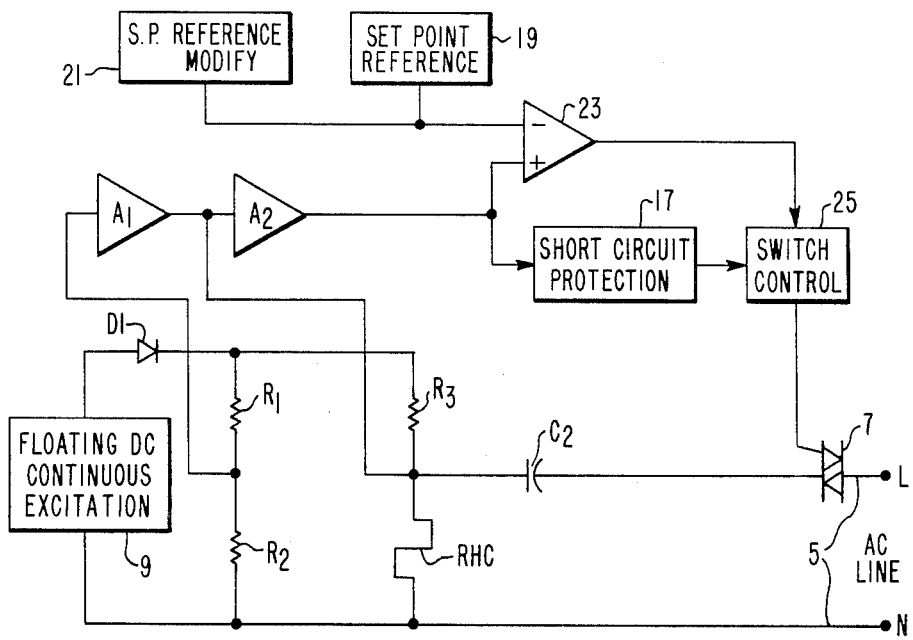
FIG. 2 is a block and circuit diagram of an alternative embodiment of this invention.

Turning to FIG. 2, an alternative embodiment of the invention includes additional details which can be readily incorporated into the embodiment described in conjunction with FIG. 1. This embodiment of the two wire heater regulator control circuit provides full cycle phase control firing. AC line voltage can be applied to the heater coil RHC, beginning at a point along a single cycle's development from zero through the positive peak and back to zero again and lasting for a variable percentage of the cycle. This system is particularly useful in low power applications in which a significant degree of accurate temperature regulation is desired.

The floating DC continuous excitation 9 is blocked from the AC line power source 5 by a blocking device consisting of an AC line capacitor C1. The continuous DC error sense circuit is comprised of the amplifiers A1 and A2 which together form a high common mode range instrumentation amplifier. When AC line voltage is being applied to the heater coil RHC, the voltage at the junction of R3-RHC is the line voltage centered about a DC offset created by the DC excitation divided by R3-RHC, and the voltage at the junction of R1-R2 is the line voltage divided by R1-R2 (R3 can be neglected from a practical standpoint) centered about a DC offset created by the DC excitation divided by R1-R2. The difference in the two DC offsets is the required bridge imbalance signal. The unwanted AC in the error signal generated by the bridge is rejected by appropriately setting the gains of the amplifiers A1 and A2.

The amplifier A2 is summing the input from the amplifier A1 with the signal from the junction of resistor R3 and the heater coil RHC, and as such, these two inputs can be amplified with different gains, $G_{A21}$ and $G_{A22}$ respectively. With the inputs from the bridge at R1-R2 and R3-RHC as described above and if:

$$G_{A1} = -K \frac{R1 + R2}{R2} ;$$

$$G_{A21} = -1; \text{ and}$$
$$G_{A22} = -K;$$

wherein K is a constant which equals less than 1.0 so that both of the amplifiers A1 and A2 are protected from being driven into saturation, it follows directly that the output of the amplifier A2 is:

$$K \cdot V_{DC-EXC} \cdot 1 - \frac{RHC}{R3 + RHC}$$

If the impedance of resistor R3 is equal to the impedance of the heater coil RHC at the desired temperature set point for the heater, the DC error is:

$$0.5 \cdot K \cdot V_{DC-EXC}$$

The conditions for bridge balance are therefore controlled by calibrating the set point reference circuit 19 to equal the DC error voltage at the desired temperature as described above. A set point reference modify circuit 21 can be provided to allow adjustments to the set point, with time, to achieve different operating points for the temperature of the heater coil. The error comparator 23 evaluate the several inputs and actuates a switch control means 25 in communication with switch means 7.

The output of amplifier A2 is also evaluated by the short circuit protection circuit 17 preferably consisting of an operational amplifier employed as a comparator. The short circuit protection circuit 17 identifies unsatisfactory conditions such as an electrical short of the heater coil RHC. For example, with the set point reference 19 set as described above and with the switch means 7 actuated to provide AC power to the heater coil, if the DC error, as established by the output of amplifier A2, approaches a value equal to $K \cdot V_{DC-EXC}$, a short circuit at the heater coil is indicated. This voltage level is sensed by the short circuit protection circuit 17. The switch control 25 which is responsive to both the error comparator 23 and the short circuit protection circuit 17, is immediately signaled by the short circuit protection circuit 17 to disable the closure of switch means 7 so that AC line voltage is removed from the heater coil.

In the situation in which the thermally responsive resistive value of the heater coil RHC is at or above the desired set point level, AC line power is not present on the bridge and therefore, AC voltage is not being rejected. With this exception when AC line power is not present on the bridge, all other circuit operations continue identically as described above. When the resistive value of the heater coil falls below the set point value but is above the short circuit protection value, the switch means 7 is closed and AC line power applied to the heater coil.

Figure 3:
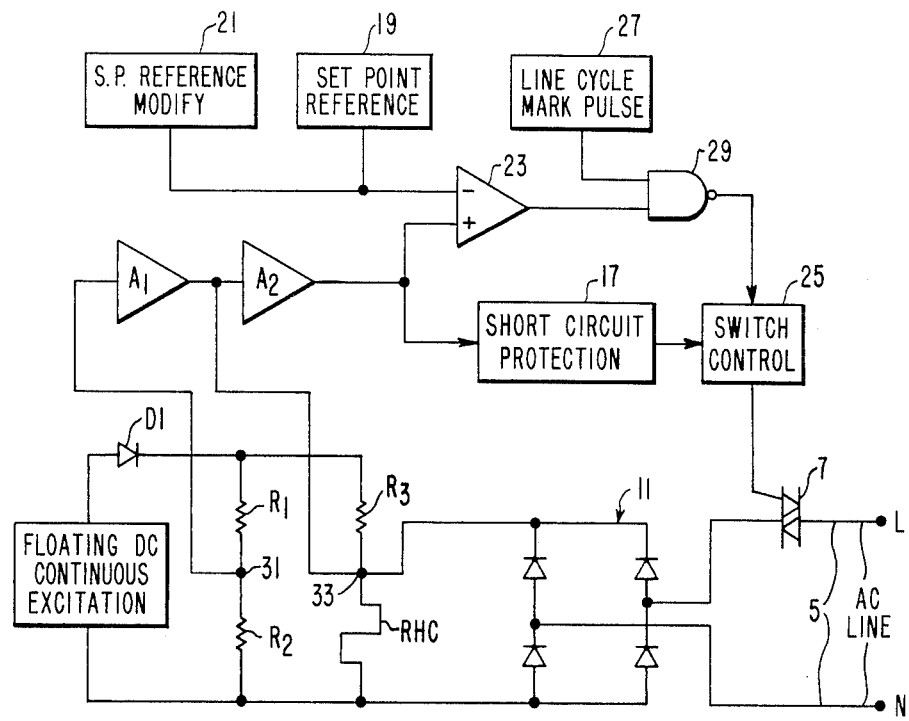
FIG. 3 is a block and circuit diagram of another alternative embodiment of this invention.

FIG. 3 illustrates another alternative embodiment of this invention in which a two wire heater regulator control circuit provides integral cycle control of the AC switch means. In this embodiment, the integral cycle control results in low switching noise. Since error information well beyond the AC line zero crossing point will not effect the firing decision until the next zero crossing, sensing is conducted at the zero crossing (beginning) of every integral power cycle for approximately 50 microseconds during which closure of the power switch is prohibited. The delay period allows time for transients to settle so that a correct error voltage results. As shown in FIG. 3, the DC blocking means 11 is a bridge rectifier.

This design presents low noise integral cycle control, because the output of the error comparator 23 is sampled only at complete cycle zero crossings by gating it with the line cycle mark pulse circuit 27 output through NAND gate 29. The switch control circuit 25 is responsive to both the NAND gate 29 output and the short circuit protection circuit 17 output in the actuation of switch means 7. Since the error comparator 23 is sampled only at the beginning of each line cycle when AC firing has not yet occurred, at all times when the bridge does have AC present, the continuous DC error sense circuitry consisting of amplifiers A1 and A2 need not reject AC line voltage because the sense circuitry output is not required. In other words, the output of amplifier A2 is required only when the DC excitation voltage is present on the heater coil bridge. Because a bridge rectifier 11 is providing DC blocking action, any AC on the bridge is referenced to the AC line voltage rather than being centered about the DC offsets as is the case when DC blocking is effected by a capacitor. With the error comparator 23 output being gated with a line cycle mark pulse 27, the AC rejection function of the high common mode range instrumentation amplifier (A1 and A2) can be dispensed with entirely. In fact the gain of each amplifier component, $G_{A1}$, $G_{A21}$ and $G_{A22}$ can all be set to −1, although saturation of the instrumentation amplifier should still be avoided. This step is desirable in this alternative embodiment since AC rejection by A1 and A2, although still possible, would be more complex due to the different AC reference and is in fact, not required in this embodiment of the invention.

Figure 4:
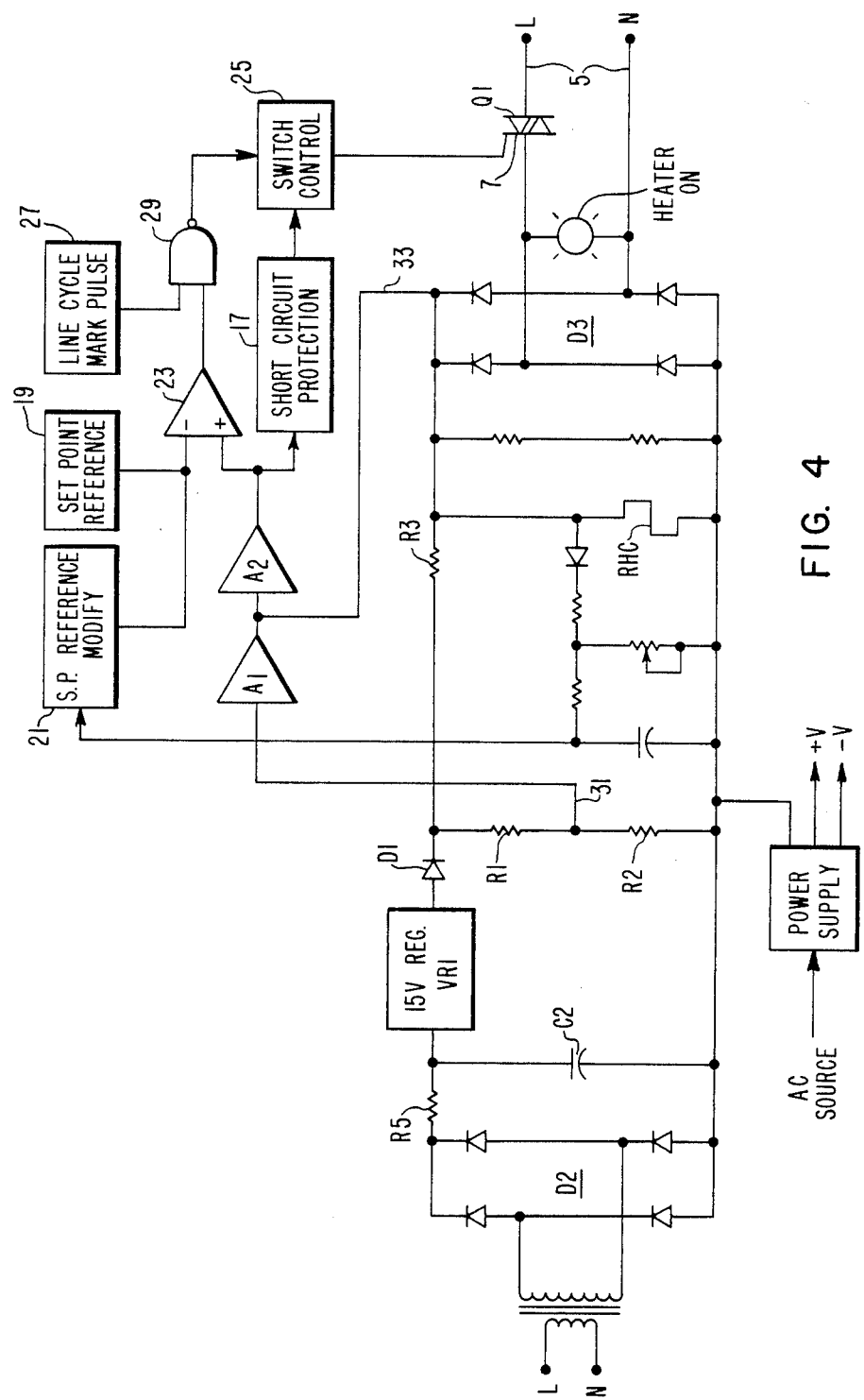
FIG. 4 is a schematic representation of the alternative embodiment of FIG. 3.

While the above described function of the electronic circuitry of this invention would enable one skilled in the art to implement such a function through numerous combinations of conventional circuit elements, one such implementation employing commercially available elements is disclosed in the detailed schematic of FIG. 4. Several specific features of the integral cycle, heater regulator control circuit of FIG. 3 are described herein in detail, particularly, the DC excitation voltage source, the AC power source, and the heater coil bridge circuit are reviewed.

The floating DC voltage continuous excitation source 9 is comprised of four basic elements. An isolated AC voltage is provided by transformer T1 and is rectified by diode bridge rectifier D2. This provides an unregulated input voltage via the filter network consisting of resistor R5 and capacitor C2, for the voltage regulator VR1. The regulated excitation voltage (15 VDC) is applied to the resistive bridge through the AC blocking device, diode D1. This diode D1 provides blocking voltage capability for the protection of the low level excitation source from the AC line voltage.

The AC power source 5 is provided via the switch means 7, a triac Q1. The AC line voltage is applied in series to the DC blocking means 11, which is a diode bridge rectifier D3. The closing of the AC switch 7 permits power to flow through the bridge rectifier D3 directly from the line 5 into the heater coil RHC. The diode bridge rectifier D3 simultaneously prevents the DC excitation current from flowing into the AC line.

The four leg resistive bridge consists of resistors R1, R2 and R3, and the heater coil RHC. The signals taken from the bridge at points 31 and 33 provide the input to the amplifiers A1 and A2 respectively.

What has been described is a two-wire heater regulator control circuit using a resistive bridge comparator circuit of which the heater coil is one leg with separate and independent excitation and heater voltage sources applied thereto. Sensing excitation voltage is continuously applied to the bridge circuit while the heater voltage source can be applied to the heater coil element as an integral cycle or a portion of a cycle.

What is claimed is:

1. A two wire heater regulator control system having continuous temperature sensing excitation independent of the application of heater voltage for controlling the temperature of a heater element; for use in combination with a heater element having only a first and second terminal thereon for the interconnection of said two wire heater regulator control system thereto, the electrical resistance of said element being a function of the temperature of said heater element, said two wire heater regulator control system comprising:

means for selectively providing a heater voltage for connection to said first and second heater element terminals, said heater voltage being an AC line voltage which supplies heating power;

means for providing a continuous sensing excitation voltage for connection to said first and second heater element terminals, said continuous sensing excitation being simultaneously present with said heater voltage and the means by which the resistance of the heater element is determined and wherein said sensing excitation is a continuous DC excitation voltage floating with respect to said AC line voltage;

means for isolating said continuous sensing excitation voltage from said heater voltage when said heater voltage is being selectively provided to said first and second heater element terminals;

a four-leg bridge circuit means including said heater element as one leg thereof, responsive to said continuous sensing excitation voltage for providing a continuous reference voltage;

means for comparing said sensing excitation voltage at said heater element with said reference voltage for producing a continuous output representing the difference therebetween, and said comparing means rejecting said AC line voltage during the application of said heater voltage to said heater element and wherein said comparing means includes a first amplifier responsive to the reference voltage and a second amplifier responsive to the first amplifier output and the voltage at said heater element, said first and second amplifiers forming a high common mode range instrumentation amplifier; and control means responsive to at least the output from said comparing means for the selective application of said heater voltage to said first and second heater element terminals and wherein the control means includes switch means for the selective application of the heater voltage to the heater element.

2. The system according to claim 1 wherein the isolation means is an AC line capacitor which blocks the sensing excitation voltage from being short circuited by and current from flowing into the AC line.

3. The system according to claim 1 wherein the isolation means is a bridge rectifier for the full wave rectification of the AC line voltage for the heater element, said bridge rectifier blocking the sensing voltage from being short circuited by the AC line voltage and from flowing into the AC line.

4. The system according to claim 3 including means responsive to the AC line voltage for detecting the zero crossings thereof and means responsive to said zero crossing detecting means for providing a mark pulse at or near said zero crossings and wherein the control means includes gate means responsive to said mark pulse and to the output from the comparing means for providing a control signal for controlling the actuation of the switch means.

5. The system according to claims 1, or 4 including circuit protection means responsive to the output of the comparing means for the identification of an output therefrom in excess of a predetermined limit, said predetermined limit indicating an electrical short in the heater element, and wherein the control means is responsive to said protection circuit means whereby heater voltage is not applied to the heater element when said predetermined limit is exceeded.

6. The system according to claim 5 including means for blocking the heater voltage from the means for providing a continuous sensing excitation voltage.

* * * * *